（12） United States Patent
Dey

(10) Patent No.: US 11,290,390 B2
(45) Date of Patent: Mar. 29, 2022

(54) METHODS, SYSTEMS, AND COMPUTER READABLE MEDIA FOR LOCKLESS COMMUNICATIONS NETWORK RESOURCE QUOTA SHARING

(71) Applicant: Oracle International Corporation, Redwood Shores, CA (US)

(72) Inventor: Debdulal Dey, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 58 days.

(21) Appl. No.: 16/690,058

(22) Filed: Nov. 20, 2019

(65) Prior Publication Data

US 2021/0152488 A1    May 20, 2021

(51) Int. Cl.
*H04L 12/24*    (2006.01)
*H04L 41/0803*    (2022.01)
(Continued)

(52) U.S. Cl.
CPC ............. *H04L 47/72* (2013.01); *H04L 43/08* (2013.01); *H04L 47/741* (2013.01);
(Continued)

(58) Field of Classification Search
CPC ....... H04L 47/72; H04L 43/08; H04L 47/748; H04L 47/822; H04L 47/741; H04L 47/801
(Continued)

(56) References Cited

U.S. PATENT DOCUMENTS 5,570,416 A    10/1996    Kroll
6,195,543 B1    2/2001    Granberg
(Continued)

FOREIGN PATENT DOCUMENTS

CN    1323500 A    11/2001
CN    101971653 A    2/2011
(Continued)

OTHER PUBLICATIONS

Final Office Action for U.S. Appl. No. 14/688,503 (dated Dec. 30, 2019).
(Continued)

*Primary Examiner* — Moustafa M Meky
*Assistant Examiner* — Elizabeth Kassa
(74) *Attorney, Agent, or Firm* — Jenkins, Wilson, Taylor & Hunt, P.A.

(57) ABSTRACT

An example method for lockless communications network resource quota sharing occurs at a first charging node of a distributed charging system comprising multiple charging nodes. The example method comprises: receiving, from a requesting entity, a first communications network resource quota request for requesting a first resource amount from the shared resources plan; without confirming that the shared resources plan has enough available resources to allot the first resource amount, providing, to the requesting entity, a first communications network resource quota for the first member, wherein the first communications network resource quota indicates a second resource amount less than the first resource amount and/or wherein the first communications network resource quota is associated with a validity time indicating when the first communications network resource quota expires; and sending, to a second charging node, a first resource reservation request for reserving resources of the shared resources plan.

20 Claims, 5 Drawing Sheets

(51) Int. Cl.
  *H04L 47/72* (2022.01)
  *H04L 43/08* (2022.01)
  *H04L 47/74* (2022.01)
  *H04L 47/80* (2022.01)
  *H04L 47/70* (2022.01)
(52) U.S. Cl.
  CPC .......... *H04L 47/748* (2013.01); *H04L 47/801* (2013.01); *H04L 47/822* (2013.01)
(58) Field of Classification Search
  USPC ........................................................ 709/226
  See application file for complete search history.

(56) References Cited

U.S. PATENT DOCUMENTS

| | | |
|---|---|---|
| 6,295,447 B1 | 9/2001 | Reichelt et al. |
| 6,393,269 B1 | 5/2002 | Hartmaier et al. |
| 6,606,668 B1 | 8/2003 | McLampy et al. |
| 6,965,667 B2 | 11/2005 | Trabandt et al. |
| 7,130,807 B1 | 10/2006 | Mikurak |
| 7,366,790 B1 | 4/2008 | Rustad et al. |
| 7,457,868 B1 | 11/2008 | Guo |
| 7,685,270 B1 | 3/2010 | Vermeulen et al. |
| 7,716,077 B1 | 5/2010 | Mikurak |
| 7,787,858 B2 | 8/2010 | Koskinen et al. |
| 7,962,458 B2 | 6/2011 | Holenstein et al. |
| 8,116,326 B2 | 2/2012 | Rockel et al. |
| 8,189,487 B1 | 5/2012 | Mateski et al. |
| 8,223,935 B2 | 7/2012 | Krishnamoorthy et al. |
| 8,341,044 B1 | 12/2012 | Patro et al. |
| 8,374,081 B2 | 2/2013 | Farrugia et al. |
| 8,411,831 B2 | 4/2013 | Thompson |
| 8,423,505 B2 | 4/2013 | Chauvet et al. |
| 8,577,701 B1 | 11/2013 | Howard et al. |
| 8,606,958 B1 | 12/2013 | Evans et al. |
| 8,640,188 B2 | 1/2014 | Riley |
| 8,694,629 B2 | 4/2014 | Cutler et al. |
| 8,737,957 B2 | 5/2014 | Raleigh |
| 8,825,003 B2 | 9/2014 | Ravishankar et al. |
| 8,965,861 B1 | 2/2015 | Shalla et al. |
| 8,989,056 B2 | 3/2015 | Baniel et al. |
| 9,185,237 B2 | 11/2015 | McMurry et al. |
| 9,268,888 B1 | 2/2016 | Leong et al. |
| 9,363,388 B2 | 6/2016 | Russell |
| 9,378,065 B2 | 6/2016 | Shear et al. |
| 9,398,434 B2 | 7/2016 | Piro, Jr. |
| 9,553,998 B2 | 1/2017 | Permude |
| 9,557,889 B2 | 1/2017 | Raleigh et al. |
| 9,710,833 B2 | 7/2017 | Malaksamudra et al. |
| 9,948,791 B2 | 4/2018 | Permude |
| 10,333,724 B2 | 6/2019 | Piro, Jr. et al. |
| 10,827,079 B1* | 11/2020 | Mostafa .............. H04L 12/1407 |
| 2001/0040949 A1 | 11/2001 | Blonder et al. |
| 2002/0147745 A1 | 10/2002 | Houben et al. |
| 2003/0172145 A1 | 9/2003 | Nguyen |
| 2003/0204592 A1 | 10/2003 | Crouse-Kemp et al. |
| 2005/0136889 A1 | 6/2005 | Zackrisson et al. |
| 2006/0148446 A1 | 7/2006 | Karlsson |
| 2006/0286963 A1 | 12/2006 | Koskinen et al. |
| 2007/0162308 A1 | 7/2007 | Peters |
| 2007/0242816 A1 | 10/2007 | Cai et al. |
| 2007/0288367 A1 | 12/2007 | Krishnamoorthy et al. |
| 2008/0010379 A1 | 1/2008 | Zhao |
| 2008/0014904 A1 | 1/2008 | Crimi et al. |
| 2008/0049630 A1 | 2/2008 | Kozisek et al. |
| 2008/0141063 A1 | 6/2008 | Ridgeway et al. |
| 2008/0247331 A1 | 10/2008 | Becker et al. |
| 2009/0061856 A1 | 3/2009 | Kazmi |
| 2009/0156163 A1 | 6/2009 | Ravishankar et al. |
| 2009/0207994 A1 | 8/2009 | Bruce et al. |
| 2009/0307347 A1 | 12/2009 | Cherkasova et al. |
| 2009/0311989 A1 | 12/2009 | Duan et al. |
| 2010/0010922 A1 | 1/2010 | Foottit et al. |
| 2010/0130162 A1 | 5/2010 | Yang |
| 2010/0228707 A1 | 9/2010 | Labuda |
| 2010/0312677 A1 | 12/2010 | Gardner |
| 2011/0010581 A1 | 1/2011 | Tanttu et al. |
| 2011/0055063 A1 | 3/2011 | Zhang et al. |
| 2011/0112905 A1 | 5/2011 | Pulijala et al. |
| 2011/0141922 A1 | 6/2011 | Kotrla et al. |
| 2011/0167471 A1 | 7/2011 | Riley et al. |
| 2011/0208628 A1 | 8/2011 | Foottit et al. |
| 2011/0211465 A1 | 9/2011 | Farrugia et al. |
| 2011/0225113 A1 | 9/2011 | Mann |
| 2011/0225379 A1 | 9/2011 | Eguchi et al. |
| 2011/0258094 A1 | 10/2011 | Guo |
| 2012/0030077 A1 | 2/2012 | Pei et al. |
| 2012/0101952 A1 | 4/2012 | Raleigh et al. |
| 2012/0116938 A1 | 5/2012 | Cai |
| 2012/0124149 A1 | 5/2012 | Gross et al. |
| 2012/0131129 A1 | 5/2012 | Agarwal et al. |
| 2012/0131391 A1 | 5/2012 | Musolff |
| 2012/0202455 A1 | 8/2012 | Cai |
| 2013/0080263 A1 | 3/2013 | Goldman et al. |
| 2013/0176908 A1 | 7/2013 | Baniel et al. |
| 2013/0179363 A1 | 7/2013 | Texier et al. |
| 2013/0212065 A1 | 8/2013 | Rahnama |
| 2013/0282626 A1 | 10/2013 | White et al. |
| 2013/0304616 A1 | 11/2013 | Raleigh |
| 2013/0332345 A1 | 12/2013 | Carter |
| 2014/0040344 A1 | 2/2014 | Gehring et al. |
| 2014/0082170 A1 | 3/2014 | Kaemmerer et al. |
| 2014/0179266 A1 | 6/2014 | Schultz et al. |
| 2014/0273922 A1 | 9/2014 | McMurry et al. |
| 2015/0019514 A1 | 1/2015 | Forster et al. |
| 2015/0026260 A1 | 1/2015 | Worthley |
| 2015/0029894 A1 | 1/2015 | Lu et al. |
| 2015/0049647 A1 | 2/2015 | Goermer et al. |
| 2015/0087260 A1* | 3/2015 | Lowenadler .......... H04M 15/61 455/406 |
| 2015/0105045 A1* | 4/2015 | Rolfe .................. H04M 15/765 455/406 |
| 2015/0089509 A1 | 5/2015 | Brown et al. |
| 2015/0148003 A1 | 5/2015 | Piro, Jr. et al. |
| 2015/0148004 A1 | 5/2015 | Piro, Jr. |
| 2015/0149625 A1 | 5/2015 | Piro, Jr. et al. |
| 2015/0181045 A1 | 6/2015 | Lang et al. |
| 2015/0206116 A1 | 7/2015 | Bess et al. |
| 2015/0222516 A1 | 8/2015 | Deval et al. |
| 2015/0242481 A1 | 8/2015 | Hasegawa et al. |
| 2015/0310512 A1 | 10/2015 | Malaksamudra et al. |
| 2015/0326497 A1 | 11/2015 | Guionnet et al. |
| 2015/0356117 A1 | 12/2015 | Kaemmerer et al. |
| 2015/0358484 A1 | 12/2015 | Permude |
| 2016/0127565 A1* | 5/2016 | Sharma ............... H04L 12/1467 455/406 |
| 2016/0128133 A1 | 5/2016 | Hobe |
| 2017/0103457 A1 | 4/2017 | Acuña-Rohter et al. |
| 2017/0134591 A1 | 5/2017 | Permude |
| 2018/0359655 A1* | 12/2018 | Zevallos ................. H04L 12/14 |
| 2019/0141493 A1* | 5/2019 | Tornkvist .............. H04M 15/72 |
| 2019/0182838 A1* | 6/2019 | Bondarenko ....... H04M 15/765 |
| 2019/0297487 A1* | 9/2019 | Munoz Sanchez ..... H04W 8/20 |

FOREIGN PATENT DOCUMENTS

| | | |
|---|---|---|
| CN | 200880127718 A | 12/2014 |
| EP | 2 398 262 A1 | 12/2011 |
| IN | 327447 | 12/2019 |
| JP | 2002-204319 | 7/2002 |
| WO | WO 00/22871 | 4/2000 |
| WO | WO 2000/019702 | 4/2000 |
| WO | WO 03/073693 A1 | 9/2003 |
| WO | WO 2013/103960 A1 | 7/2013 |

OTHER PUBLICATIONS

Notice of Allowance and Fee(s) Due for U.S. Appl. No. 13/832,115 (dated Jul. 8, 2015).

Extended European Search Report for European Application No. 13733784.6 (dated Jun. 25, 2015).

(56) References Cited

OTHER PUBLICATIONS

Final Office Action for U.S. Appl. No. 13/832,115 (dated Mar. 23, 2015).
Applicant-Initiated Interview Summary for U.S. Appl. No. 13/832,115 (dated Mar. 18, 2015).
Notice of Allowance and Fee(s) Due for U.S. Appl. No. 13/735,670 (dated Nov. 10, 2014).
Notice of Grant for Chinese Patent Application No. 200880126771.8 (dated Nov. 4, 2014).
Non-Final Office Action for U.S. Appl. No. 13/832,115 (dated Nov. 3, 2014).
European Search Report for European Patent Application No. 08859561.6 (dated Oct. 21, 2014).
Communication of European publication number and information on the application of Article 67(3) EPC for European Application No. 13733784.6 (dated Oct. 15, 2014).
Non-Final Office Action for U.S. Appl. No. 13/735,670 (dated Jul. 9, 2014).
Third Office Action for Chinese Patent Application No. 200880126771.8 (dated May 4, 2014).
Notice of Allowance and Fee(s) Due for U.S. Appl. No. 12/335,416 (dated May 2, 2014).
Applicant-Initiated Interview Summary for U.S. Appl. No. 12/335,416 (dated Jan. 29, 2014).
Second Office Action for Chinese Patent Application No. 200880126771.8 (dated Sep. 4, 2013).
Non-Final Office Action for U.S. Appl. No. 12/335,416 (dated Oct. 23, 2013).
Interview Summary for U.S. Appl. No. 12/335,416 (dated May 20, 2013).
Notification of Transmittal of the International Search Report and the Written Opinion of the International Searching Authority, or the Declaration for International Application No. PCT/US2013/020528 (dated Apr. 29, 2013).
Commonly-assigned, co-pending U.S. Appl. No. 13/832,115 for "Methods, Systems, and Computer Readable Media for Adjusting a Quota Consumption Rate," (Unpublished, filed Mar. 15, 2013).
Final Office Action for U.S. Appl. No. 12/335,416 (dated Jan. 30, 2013).
First Office Action for Chinese Patent Application No. 200880126771.8 (dated Oct. 10, 2012).
"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).
Non-Final Official Action for U.S. Appl. No. 12/335,416 (dated Jun. 28, 2012).
Final Official Action for U.S. Appl. No. 12/335,416 (dated Dec. 6, 2011).
"3rd Generation Partnership Project; Technical Specification Group Services and System Aspects; Policy and charging control architecture (Release 11)," 3GPP TS 23.203 V11.4.0, pp. 1-167 (Dec. 2011).
"3rd Generation Partnership Project; Technical Specification Group Core Network and Terminals; Policy and Charging Control: Spending Limit Reporting over Sy reference point (Release 11)," 3GPP TS 29.219 V1.0.0, pp. 1-20 (Nov. 2011).
Tekelec et al., "Discussion paper on Usage-reporting from PCRF to OCS over Sy," 3GPP TSG SA WG2 #86, pp. 1-2 (Jul. 11-15, 2011).
"3rd Generation Partnership Project; Technical Specification Group Services and System Aspects; Study on Policy solutions and enhancements (Release 11)," 3GPP TR 23.813 V11.0.0, pp. 1-41 (Jun. 2011).
Official Action for U.S. Appl. No. 12/335,416 (dated Apr. 20, 2011).
Ericsson et al., "IE provided over Sy interface," 3GPP TSG SA WG2 #83, TD S2-110980, pp. 1-7 (Feb. 2011).
Cheboldaeff, "Interaction between an Online Charging System and a Policy Server," ICN 2011: The Tenth International Conference on Networks, pp. 47-51 (2011).

Communication of European publication number and information on the application of Article 67(3) EPC for European application No. 08859561.6 (dated Sep. 1, 2010).
Notification of Transmittal of the International Search Report and the Written Opinion of the International Searching Authority, or the Declaration for corresponding International Application No. PCT/US2008/086866 (dated May 25, 2009).
Non-Final Office Action for U.S. Appl. No. 14/688,503 (dated Apr. 8, 2019).
Notice of Allowance and Fee(s) Due and Examiner-Initiated Interview Summary for U.S. Appl. No. 14/554,026 (dated Feb. 6, 2019).
Applicant Initiated Interview Summary for U.S. Appl. No. 14/554,026 (dated Jan. 17, 2019).
Advisory Action and AFCP 2.0 Decision for U.S. Appl. No. 14/688,503 (dated Dec. 27, 2018).
Non-Final Office Action for U.S. Appl. No. 14/554,026 (dated Sep. 25, 2018).
Final Office Action for U.S. Appl. No. 14/688,503 (dated Aug. 15, 2018).
Non-Final Office Action for U.S. Appl. No. 14/199,457 (dated Apr. 5, 2018).
Applicant Initiated Interview Summary for U.S. Appl. No. 14/688,503 (dated Apr. 5, 2018).
Advisory Action, Examiner-Initiated Interview Summary, and AFCP 2.0 Decision for U.S. Appl. No. 14/554,026 (dated Mar. 19, 2018).
Final Office Action for U.S. Appl. No. 14/554,026 (dated Jan. 11, 2018).
Non-Final Office Action for U.S. Appl. No. 14/688,503 (dated Dec. 29, 2017).
Notice of Allowance and Fee(s) Due for U.S. Appl. No. 15/411,714 (dated Nov. 13, 2017).
Advisory Action for U.S. Appl. No. 14/199,457 (dated Oct. 18, 2017).
Applicant-Initiated Interview Summary for U.S. Appl. No. 14/554,026 (dated Oct. 17, 2017).
Examiner-Initiated Interview Summary for U.S. Appl. No. 15/411,714 (dated Aug. 9, 2017).
Non-Final Office Action for U.S. Appl. No. 15/411,714 (dated Jul. 21, 2017).
Non-Final Office Action for U.S. Appl. No. 14/554,026 (dated Jun. 29, 2017).
Final Office Action for U.S. Appl. No. 14/199,457 (dated Jun. 22, 2017).
Notice of Allowance and Fee(s) Due for U.S. Appl. No. 14/259,503 (dated Apr. 10, 2017).
Applicant Initated Interview Summary for U.S. Appl. No. 14/259,503 (dated Mar. 3, 2017).
Applicant Initated Interview Summary for U.S. Appl. No. 14/199,457 (dated Mar. 3, 2017).
Non-Final Office Action for U.S. Appl. No. 14/199,457 (dated Dec. 7, 2016).
Non-Final Office Action for U.S. Appl. No. 14/259,503 (dated Dec. 1, 2016).
Non-Final Office Action for U.S. Appl. No. 14/554,026 (dated Nov. 18, 2016).
Final Office Action for U.S. Appl. No. 14/272,700 (dated Oct. 6, 2016).
Notice of Allowance and Fee(s) Due and Examiner-Initated Interview Summary for U.S. Appl. No. 14/620,895 (dated Sep. 14, 2016).
Final Office Action for U.S. Appl. No. 14/199,457 (dated May 25, 2016).
Non-Final Office Action for U.S. Appl. No. 14/620,895 (dated Mar. 23, 2016).
Non-Final Office Action for U.S. Appl. No. 14/272,700 (dated Mar. 23, 2016).
Notice of Allowance and Fee(s) Due for U.S. Appl. No. 14/490,051 (dated Mar. 18, 2016).
Final Office Action for U.S. Appl. No. 14/259,503 (dated Jan. 28, 2016).
Applicant-Initiated Interview Summary for U.S. Appl. No. 14/490,051 (dated Dec. 17, 2015).

(56) References Cited

OTHER PUBLICATIONS

Restriction and/or Election Requirement for U.S. Appl. No. 14/620,895 (dated Dec. 9, 2015).
Non-Final Office Action for U.S. Appl. No. 14/490,051 (dated Oct. 9, 2015).
Non-Final Office Action for U.S. Appl. No. 14/199,457 (dated Oct. 6, 2015).
Non-Final Office Action for U.S. Appl. No. 14/259,503 (dated Aug. 17, 2015).
"Overview of 3GPP Release 11 V0.2.0 (Sep. 2014)," ETSI Mobile Competence Centre, 2014.
3GPP, "Digital cellular telecommunications system (Phase 2+); Universal Mobile Telecommunications System (UMTS); LTE; IP Multimedia Subsystem (IMS) Service Continuity; Stage 2," Technical Specification, ETSI TS 123 237 V11.9.0, Release 11, pp. 1-170 (Sep. 2013).
"Synchronous Optical Network (SONET) Transport Systems: Common Generic Criteria," Telcordia Technologies Generic Requirements, GR-253-CORE, Issue 4, pp. 1-697 (Dec. 2005).
"Overview of 3GPP Release 99, Summary of all Release 99 Features," ETSI Mobile Competence Centre, 2004.
"ANSI T1.107-200x," Digital Hierarchy—Formats Specifications, American National Standard for Telecommunications, 2001.
"American National Standard for Telecommunications—Digital hierarchy—Electrical interfaces," American National Standards Institute (ANSI), ANSI T1.102-1987, pp. 1-31 (Aug. 27, 1987).
Advisory Action, Applicant-Initiated Interview Summary and AFCP 2.0 Decision for U.S. Appl. No. 14/688,503 (dated Apr. 9, 2020).
Notification of Transmittal of the International Search Report and the Written Opinion of the International Searching Authority, or the Declaration for International Application No. PCT/US2020/057718 (dated Feb. 16, 2021).

\* cited by examiner

400

402

RECEIVE, FROM A REQUESTING ENTITY, A FIRST COMMUNICATIONS NETWORK RESOURCE QUOTA REQUEST ASSOCIATED WITH A FIRST MEMBER OF A SHARED RESOURCES PLAN, WHEREIN THE COMMUNICATIONS NETWORK RESOURCE QUOTA REQUEST IS FOR REQUESTING A FIRST RESOURCE AMOUNT FROM THE SHARED RESOURCES PLAN

404

WITHOUT CONFIRMING THAT THE SHARED RESOURCES PLAN HAS ENOUGH AVAILABLE RESOURCES TO ALLOT THE FIRST RESOURCE AMOUNT, PROVIDE, TO THE REQUESTING ENTITY, A FIRST COMMUNICATIONS NETWORK RESOURCE QUOTA FOR THE FIRST MEMBER, WHEREIN THE FIRST COMMUNICATIONS NETWORK RESOURCE QUOTA INDICATES A SECOND RESOURCE AMOUNT LESS THAN THE FIRST RESOURCE AMOUNT AND/OR WHEREIN THE FIRST COMMUNICATIONS NETWORK RESOURCE QUOTA IS ASSOCIATED WITH A VALIDITY TIME INDICATING WHEN THE FIRST COMMUNICATIONS NETWORK RESOURCE QUOTA EXPIRES

406

SEND, TO A SECOND CHARGING NODE, A FIRST RESOURCE RESERVATION REQUEST FOR RESERVING RESOURCES OF THE SHARED RESOURCES PLAN

FIG. 4

METHODS, SYSTEMS, AND COMPUTER READABLE MEDIA FOR LOCKLESS COMMUNICATIONS NETWORK RESOURCE QUOTA SHARING

TECHNICAL FIELD

The subject matter described herein relates to communications networks. More particularly, the subject matter described herein relates to methods, systems, and computer readable media for lockless communications network resource quota sharing.

BACKGROUND

Communications network service providers can offer a variety of different network services to mobile device subscribers. Resources plans offered by service providers are typically characterized by a combination of different performance categories and various resource amounts. For example, a subscriber pays a monthly fee for a resources plan (e.g., a mobile data plan or a subscription plan) with a given bandwidth speed, a given resource amount of download size resource quota, and/or a specific quality of service (QoS) level. Similarly, another subscriber may subscribe to a different resources plan with a lower bandwidth speed, less resource quota allocation, and/or a lower QoS level.

Sometimes, subscribers may share a resources plan (e.g., a data plan or a credit plan). For example, a family share data plan can allow multiple user devices (e.g., of a husband, a wife, and their kids) to share a high-speed data allotment (20 gigabytes) per month. In this example, as with most data plans, a service provider typically suspends the subscribers' service once the shared data is consumed. In another example, a family share plan may involve sharing a portion of charges spent by one or more members, e.g., the family share plan may pay 20% of a child member's charges up to a maximum money amount (e.g., the plan's credit limit).

One potential way to prevent resource over-consumption by members of a shared resources plan involves using a lock on the shared resources plan when a resource quota request is made by one member of the plan. While using locks can prevent data over-consumption (and mitigate revenue exposure for the service provider), such solutions can impact latency and performance in the network. Additional issues can arise if an online charging system (OCS) utilizes a distributed architecture where some OCS nodes handle different resources plans and/or where some OCS nodes handle resource quota requests for different members of a same shared resources plan.

Accordingly, there exists a need for methods, systems, and computer readable media for lockless communications network resource quota sharing.

SUMMARY

Methods, systems, and computer readable media for lockless communications network resource quota sharing are disclosed. In some embodiments, an example method occurs at a first charging node of a distributed charging system comprising multiple charging nodes, wherein the first charging node is for handling communications network resource quota requests associated with a first member of a shared resources plan, wherein a second charging node manages resource reservations associated with the shared resources plan. The example method comprises: receiving, from a requesting entity, a first communications network resource quota request for requesting a first resource amount from the shared resources plan; without confirming that the shared resources plan has enough available resources to allot the first resource amount, providing, to the requesting entity, a first communications network resource quota for the first member, wherein the first communications network resource quota indicates a second resource amount less than the first resource amount and/or wherein the first communications network resource quota is associated with a validity time indicating when the first communications network resource quota expires; and sending, to the second charging node, a first resource reservation request for reserving resources of the shared resources plan.

In some embodiments, an example system includes a first charging node of a distributed charging system comprising multiple charging nodes. The first charging node is implemented using the at least one processor and memory. The first charging node is for handling communications network resource quota requests associated with a first member of a shared resources plan and a second charging node manages resource reservations associated with the shared resources plan. The first charging node is configured for: receiving, from a requesting entity, a first communications network resource quota request for requesting a first resource amount from the shared resources plan; without confirming that the shared resources plan has enough available resources to allot the first resource amount, providing, to the requesting entity, a first communications network resource quota for the first member, wherein the first communications network resource quota indicates a second resource amount less than the first resource amount and/or wherein the first communications network resource quota is associated with a validity time indicating when the first communications network resource quota expires; and sending, to a second charging node, a first resource reservation request for reserving resources of the shared resources plan.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which:

FIG. 4 is a flow diagram illustrating an example process for lockless communications network resource quota sharing.

DETAILED DESCRIPTION

Figure 1:
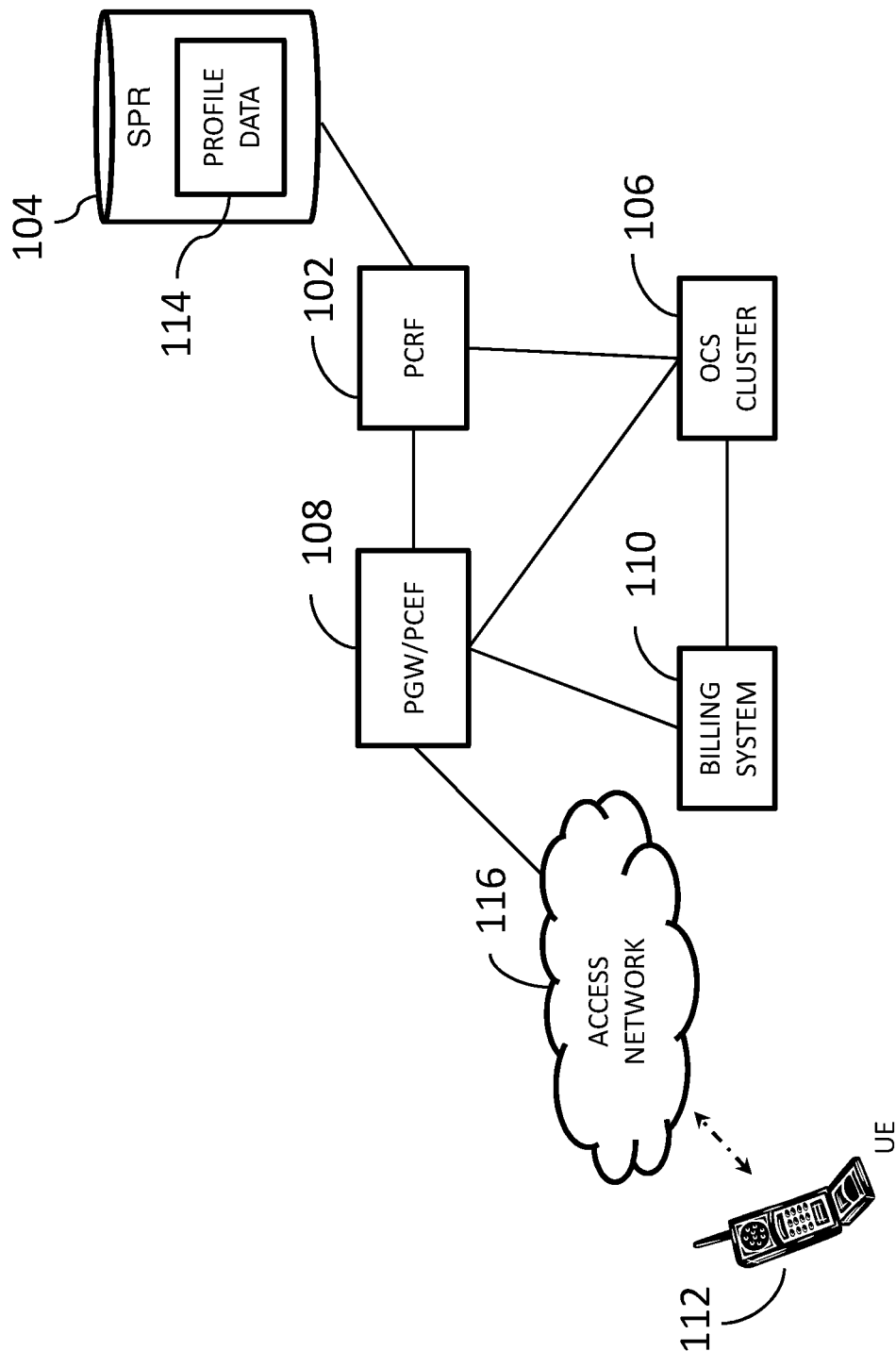
FIG. 1 is a block diagram illustrating an example communications environment for lockless communications network resource quota sharing.

The subject matter described herein relates to methods, systems, and computer readable media for lockless communications network resource quota sharing. Shared resources plans are available to subscribers of various communications networks. For example, mobile phone service providers sell family share plans, where a number of family members (or their user devices) can share minutes or data from a plan's total amount (e.g., a monthly allotment). In another example, family share charge plans may allow family members to share credits or charges, e.g., where at least a portion of the charges are paid by a shared credit or money allotment.

A lock-based charging architecture may handle a shared resources plan by locking the plan or a related parent account when a child member of the plan requests resources, thereby ensuring that no parallel or concurrent events (e.g., associated with other members of the shared resources plan) can (over)consume resources from the plan or parent account. While locking the plan or parent account prevents revenue exposure due to possible overconsumption, such locking can significantly impact latency and performance of the system. Moreover, if an online charging system (OCS) utilizes a distributed architecture where some OCS nodes handle different members of a same shared resources plan, then additional complexity may be needed to achieve resource quota sharing using a lock-based charging architecture.

In accordance with some aspects of the subject matter described herein, techniques, methods, systems, or mechanisms are disclosed for lockless communications network resource quota sharing. In some embodiments, lockless communications network resource quota sharing may be utilized to rate (e.g., provide a resource quota for use by) a member of a shared resources plan without locking a parent account. For example, a charging node (e.g., OCS node) or a related module in accordance with at least some aspects described herein may receive a resource quota request related to a member of a shared resources plan (e.g., a family data share plan) and, in response, provide a small resource quota (e.g., 5 megabytes (MB) of data) without locking the shared resources plan and/or prior to reserving adequate resources of the shared resources plan to fully grant the resource quota request (e.g., via another OCS node). In this example, the requesting entity (e.g., a packet gateway) may allow the subscriber to consume the initial resource quota, e.g., during a subscriber data session. While the initial resource quota is being consumed, the charging node may query another charging node for reserving additional resources for use by the subscriber. Continuing with this example, by the time the requesting entity requests an additional resource quota, the charging node may have reserved enough resources to fully grant this subsequent resource quota request. Alternatively, if the charging node determines that the subscriber has no remaining resources for consumption (.g., by communicating with another charg- ing node managing the shared resources account), the charging node can deny the subsequent resource quota request, thereby limiting the potential loss of revenue to the initial small resource quota.

In accordance with some aspects of the subject matter described herein, a lockless communications network resource quota sharing algorithm or a related implementation may be implemented on multiple charging nodes (e.g., OCS nodes) of a distributed OCS (e.g., an OCS cluster). For example, the algorithm may instruct a charging node of a distributed OCS to react to an event by providing a minimum quota (e.g., a predetermined amount of resources which may be relatively small) and/or a validity time (e.g., an amount of time indicating when a resource quota expires); may instruct the charging node to reserve resources from a parent (e.g., a charging node handling resource reservation and/or allocation for a relevant shared resources plan); and may instruct the charging node to reserve a minimum quota or a predetermined value unless no more resources are available from the shared resources plan.

Advantageously, by utilizing lockless communications network resource quota sharing, latency and performance issues associated with resource sharing and related charging can be mitigated or prevented. Further, a distributed OCS cluster that utilizes lockless communications network resource quota sharing can reduce complexity involving scenarios where different members of a shared resources plan are handled by different nodes of the distributed OCS cluster since synchronous locking over the network and inline of the request is not required and related locking overhead is avoided.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example communications environment 100 for lockless communications network resource quota sharing. Communications environment 100 may represent one or more communications networks for providing various data, applications, and/or services, e.g., phone, internet, texting, etc.

Referring to FIG. 1, communications environment 100 may include a policy server 102, a subscriber profile repository (SPR) 104, an online charging system (OCS) cluster 106, and a packet data network (PDN) gateway (PGW) 108, and a billing system 110. Communications environment 100 may include an access network 116 that communicatively connects PGW 108 to a user equipment (UE) device 112 associated with a subscriber. UE device 112 may represent a computer or device (e.g., a mobile smart phone, a tablet computer device, a personal digital assistant (PDA), etc.) capable of connecting to various network nodes in communications environment 100 via access network 116 and/or may be capable of connecting to the internet (e.g., via PGW 108) or receiving services or data using communications environment 100.

OCS cluster 106 may represent a distributed OCS containing one or more OCS nodes. OCS cluster 106 or node(s) thereof may be any suitable entity or entities (e.g., one or more computing platforms or software executing on at least one processor) for performing one or more charging functions. For example, some nodes of OCS cluster 106 may process or handle resource quota requests for different subscribers. In this example, some nodes of OCS cluster 106 may handle resource quota requests from subscribers of a same shared resources plan, e.g., a family data sharing plan.

In some embodiments, a shared resources plan may allow members (e.g., mobile network subscribers) to share or use communications network related resources from a plan's total resources amount (e.g., a total monthly allotment). For example, shared resources may involve a data amount (e.g., 5 gigabytes (GB)), a time amount (e.g., 100 minutes of internet service), or a credit amount (e.g., $200).

In some embodiments, OCS cluster 106 or node(s) thereof may receive subscriber usage data (e.g., traffic and signaling data generated or received by UE 112) from PGW 108 and/or another entity. OCS cluster 106 or node(s) thereof may be configured to maintain a subscriber usage database to record and store the subscriber usage data for various subscribers received from PGW 108. In some embodiments, OCS cluster 106 or node(s) thereof may be configured to utilize a usage database to distinguish and keep track of specific data usage (e.g., on a per quota bucket basis) for each subscriber.

In some embodiments, OCS cluster 106 or node(s) thereof may include functionality (e.g., one or more modules) for functionality for utilizing a lockless communications network resource quota sharing algorithm or various aspects described herein. For example, QME 206 may be configured for receiving a resource quota request related to a member of a shared resources plan (e.g., a family data share plan) and, in response, providing at least a minimum resource quota without locking the shared resources plan and/or prior to reserving adequate resources of the shared resources plan via another OCS node (e.g., OCS node 204) managing the allocation and/or reservation of the resources of the shared resources plan.

PGW 108 may represent any suitable entity in communications environment 100 configured to receive packet communications from UE 112 via access network 116 as well as reporting the usage associated with UE 112 to OCS cluster 106 or node(s) thereof (e.g., via a Gy interface). PGW 108 may also be configured to provide network condition data (e.g., traffic load conditions) to policy server 102 and/or OCS cluster 106 or node(s) thereof. PGW 108 may also be configured to execute or enforce the policy rules provided by policy server 102. In some embodiments, PGW 108 may include any network element configured to support or host at least one of a policy and charging enforcement function (PCEF), a bearer binding and event reporting function (BBERF), a deep packet inspection (DPI) function, a traffic detection function (TDF), or any other like network element function.

In some embodiments, PGW 108 may be configured for requesting and enforcing resource quota for various subscribers. For example, when a subscriber or related UE 112 connects to access network 116 or communications environment 100, PGW 108 may send a resource quota request to OCS cluster 106 or node(s) thereof for requesting and receiving a resource quota for use by the subscriber. In this example, as the subscriber using its allotted resources (e.g., when the remaining amount of the resource quota at PGW 108 reaches or is below a threshold value), PGW 108 may send another resource quota request to OCS cluster 106 or node(s) thereof for requesting and receiving additional resource quota for use by the subscriber. Continuing with this example, when the subscriber logs off the network or terminates the session, PGW 108 may release or relinquish any remaining quota back to OCS cluster 106 or node(s) thereof for future use.

Billing system 110 may represent any suitable entity in communications environment 100 configured to perform one or more billing and/or charging functions. In some embodiments, billing system 110 may be used to compute or compile resource usage for billing purposes and/or for providing interfaces for allowing subscribers to pay bills or purchases additional resources. For example, billing system 110 may provide a user interface or other communications interface for allowing a subscriber to top off or purchase additional resources for a shared resources plan. In this example, once the subscriber has completed a transaction to purchase resources for the shared resources plan, billing system 110 may notify OCS cluster 106 or nodes thereof such that these resources can be utilized, e.g., by one or more members of the shared resources plan.

Policy server 102 may represent any suitable entity for performing one or more policy functions and/or charging functions. For example, policy server 102 may be configured to determine and create policy rules for subscribers that subscribe to services in communications environment 100. In this example, policy server 102 may generate policy and charging control (PCC) rules and provide the rules to one or more network elements (e.g., PGW 108). Continuing with this example, the PCC rules created by policy server 102 may pertain to services, QoS levels, and charging rules associated with one or more subscribers. In some embodiments, policy server 102 may include a policy and charging rules function (PCRF) and/or may be hosted and executed by a Diameter-based network element or server.

In some embodiments, policy server 102 or another entity may be configured to request quota usage information from OCS cluster 106 or an OCS node thereof. The quota usage information may be requested and received via an application interface with OCS cluster 106 or node(s) thereof (e.g., an Sy interface). In some embodiments, policy server 102 may request the quota usage information from OCS cluster 106 or node(s) thereof by sending a Diameter request message that may include at least one of Diameter session identifier information, subscriber identifier information (e.g., IMSI), subscriber tier information, subscriber service type identifier information, and/or other information. Upon receiving the request, OCS cluster 106 or node(s) thereof may be configured to use the provided information provided to determine the appropriate subscriber quota usage information, which may be ultimately returned to requesting policy server 102.

SPR 104 may include a database configured to store profile information pertaining to subscribers of communications environment 100. For example, the stored subscriber profile data may include a resources plan code (e.g., a billing plan code or name) and the entitlements associated with the resources plan code. Exemplary entitlements include, but are not limited to, voice over Internet protocol (VoIP) service, video chat, domestic roaming, international roaming, MiFi, data, gifts (e.g., special promotions), and specific equipment. In some embodiments, SPR 104 may be integrated with one or more network elements or may be distributed across multiple computing platforms or devices.

In some embodiments, UE 112 may register for services with a communications network by initiating a network attachment procedure. For example, UE 112 can send a user attach request message to PGW 108. In response to receiving the attachment request message, PGW 108 may send a Diameter credit control request (CCR) message to policy server 102. Policy server 102 may then send a Diameter user-data-request (UDR) message containing a user identifier to SPR 104 to request a resources plan code and/or plan entitlements associated with the subscriber. For example, SPR 104 may be configured to store resources plan data in a local profile database 114. Alternatively, SPR 104 may query an external database containing the subscriber's resources plan information.

It will be appreciated that FIG. 1 is for illustrative purposes and that various nodes and/or modules, locations, and/or functionality described above in relation to FIG. 1 may be changed, altered, added, or removed.

Figure 2:
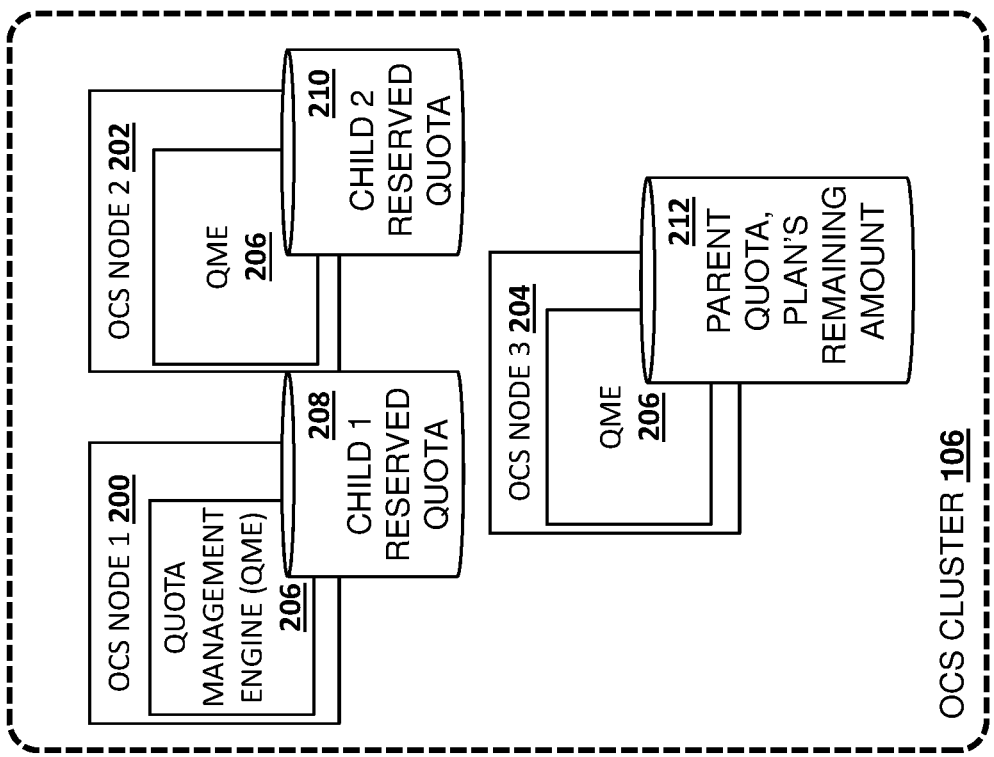
FIG. 2 is a block diagram illustrating an example online charging system (OCS) cluster for lockless communications network resource quota sharing.

FIG. 2 is a block diagram illustrating OCS cluster 106 for lockless communications network resource quota sharing. Referring to FIG. 2, OCS cluster 106 may include one or more OCS nodes, e.g., OCS nodes 200-204. Each of OCS nodes 200-204 may be any suitable entity (e.g., a computing platform, or software executing on at least one processor) for performing one or more charging related functions. In some embodiments, each of OCS nodes 200-204 may be responsible for handling resource quota requests from multiple subscribers, where resource quota requests from at least one subscriber is not handled by all of OCS nodes 200-204. For example, OCS node 200 may handle resource quota requests from a first mobile subscriber, OCS node 202 may handle resource quota requests from a second mobile subscriber, and OCS node 200 may handle resource quota requests from a third mobile subscriber.

In some embodiments, subscribers that are associated with different OCS nodes may be members of a same shared resources plan. For example, a shared resources plan may represent a data sharing plan for a family, where OCS nodes 200 and 202 handles quota requests from child or secondary members of the shared resources plan and OCS node 204 manages the parent or primary member of the shared resources plan. In this example, assuming OCS node 204 manages resource reservations for resources of the shared resources plan, each of OCS nodes 200-202 may send resource reservations to OCS node 204.

Each of OCS nodes 200-204 may include a quota management engine (QME) 206 and a data storage, e.g., one of data storages 208-212. QME 206 may be any suitable entity (e.g., software executing on at least one processor) for maintaining, adjusting, providing, and/or reporting resource quotas or quota related information. QME 206 may access various databases and/or data storages. For example, QME 206 may access a database containing quota usage information (e.g., reserved resource amounts, a plan's remaining resources amount, etc.) for one or more subscribers. QME 206 may also communicate with various nodes and entities (e.g., other OCS nodes and/or QMEs) in communications environment 100.

In some embodiments, QME 206 may include functionality for utilizing a lockless communications network resource quota sharing algorithm or various aspects described herein. For example, QME 206 may be configured for receiving a resource quota request related to a member of a shared resources plan (e.g., a family data share plan) and, in response, providing at least a minimum resource quota without locking the shared resources plan and/or prior to reserving adequate resources of the shared resources plan via another OCS node (e.g., OCS node 204) managing the allocation and/or reservation of the resources of the shared resources plan. In this example, by not locking the shared resources plan, multiple members of the shared resources plan can concurrently request and/or receive resource quotas from one or more OCS nodes in OCS cluster 106.

In some embodiments, QME 206 (e.g., of OCS node 200) may be configured for receiving, from a requesting entity (e.g., PGW 108), a first resource quota request for requesting a first resource amount from a shared resources plan; prior to sending a first resource reservation request to a second charging node (e.g., OCS node 204), providing, to the requesting entity, a first resource quota for the first member, wherein the first resource quota indicates a second resource amount less than the first resource amount; and sending, to the second charging node, a first resource reservation request for reserving resources of the shared resources plan.

Each of data storages 208-212 may include any suitable entity (e.g., one or more non-transitory computer readable media or one or more storage devices) for storing data associated with data usage, including resource quotas, reserved resource amounts, triggers, and data usage rules. For example, as depicted in FIG. 2, data storage 208 may store resource related information (e.g., reserved resource amounts) usable for granting resource quota requests associated with a first subscriber (e.g., a child member) of a shared resources plan, data storage 210 may store resource related information (e.g., reserved resource amounts) usable for granting resource quota requests associated with a second subscriber (e.g., a second child member) of the shared resources plan; and data storage 212 may store resource related information (e.g., reserved resource amounts, subscriber usage remaining resources available for consumption) usable for granting resource quota requests associated with a third subscriber (e.g., the primary member) of the shared resources plan.

In some embodiments, each of data storages 208-212 may be local to or accessible by a respective QME 206 or a related OCS node. For example, data storage 208 may be integrated with OCS node 200 or located externally to OCS node 200; data storage 210 may be integrated with OCS node 202 or located externally to OCS node 200; and data storage 212 may be integrated with OCS node 204 or located externally to OCS node 204.

It will be appreciated that FIG. 2 and its related description are for illustrative purposes and that OCS cluster 106 and/or various other entities in FIG. 2 may include additional and/or different modules, components, or functionality.

Figure 3A:
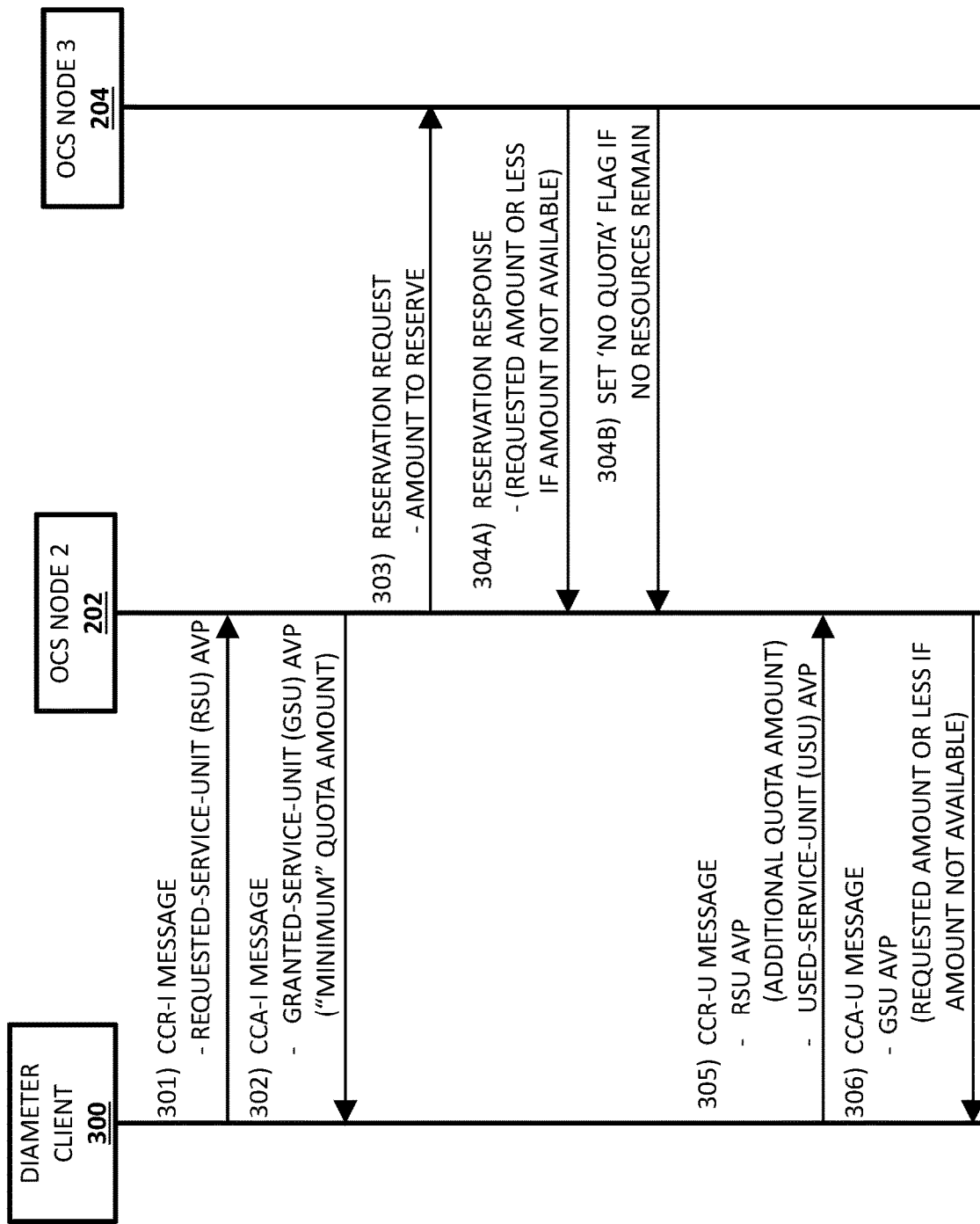
FIGS. 3A-3B are message flow diagrams illustrating example messages associated with lockless communications network resource quota sharing.
Figure 3B:
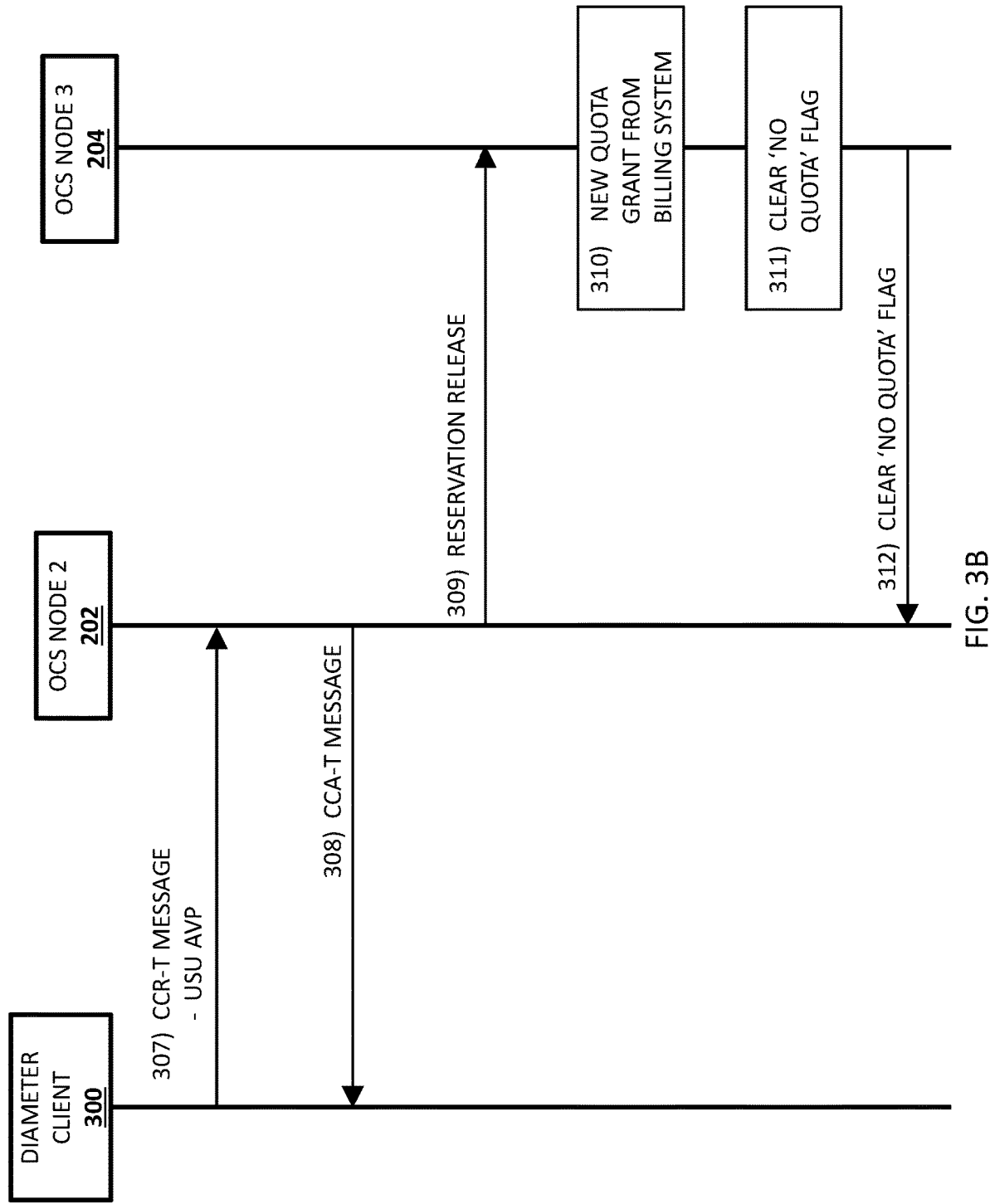

FIGS. 3A-3B are message flow diagrams illustrating an example messages associated with lockless communications network resource quota sharing. In FIGS. 3A-3B, Diameter client 300 represents a requesting entity (e.g., a network node) that utilizes a Diameter protocol and/or other protocols for interacting with OCS cluster 106 or OCS nodes (e.g., OCS node 202 and 204) therein. For example, Diameter client 300 may represent an entity that requests and/or enforces resource quotas, tracks resource usage, and/or provides resource usage information. In some embodiments, Diameter client 300 may include a PCEF or functionality similar to a PCEF. For example, Diameter client 300 may include a network element configured to support or host a PGW, a PCEF, a BBERF, a TDF, or a DPI function.

In some embodiments, e.g., as depicted in FIGS. 3A-3B, OCS node 202 and OCS node 204 may represent nodes of OCS cluster 106, where OCS node 202 handles a first mobile subscriber that is a child member (e.g., a secondary member) of a shared resources plan and where OCS node 204 handles a different mobile subscriber that is a parent member (e.g., a primary member) of the shared resources plan. In such embodiments, OCS node 204 may manage the plan's total resource amount (e.g., a total monthly allotment) associated with the shared resources plan and may be responsible for handling related resource reservations, e.g., allotting portions from the plan's total resource amount to OCS node 202 and/or other OCS nodes for usage by various members of the shared resources plan.

Referring to FIG. 3A, in step 301, a Diameter CCR initial (CCR-I) message or another quota request message may be sent from Diameter client 300 to OCS node 202, where the CCR-I message includes a requested service unit (RSU) attribute value pair (AVP) indicating a requested resource amount (e.g., 50 MB). For example, after a subscriber or a related UE 112 of a shared resources plan attaches to access network 116 or environment 100, Diameter client 300 may send a Diameter CCR-I message for requesting a resource quota (e.g., a data usage amount, a time usage amount, or a money usage amount) associated with the subscriber.

In some embodiments, Diameter client 300 may be a PCEF handling traffic of a mobile subscriber that is a member (e.g., a child member) of a shared resources plan and OCS node 202 may be configured for handling this subscriber and enforcing any resource quotas. In such embodiments, the shared resources plan or the plan's total resource amount is managed by a different OCS node (OCS node 204) in OCS cluster 106.

In step 302, a Diameter credit control answer initial (CCA-I) message or another quota response message may be sent from OCS node 202 to Diameter client 300, where the CCA-I message includes a granted service unit (GSU) AVP indicating a granted resource amount (e.g., 5 MB).

In some embodiments, OCS node 202 may grant a resource quota request without knowing if a subscriber or a related shared resources plan has enough remaining resources available to grant the resource quota request. In such embodiments (e.g., where OCS node 202 does not know if a resource quota can be fully granted), OCS node 202 may grant a smaller resource amount than requested by Diameter client 300 for the subscriber.

In some embodiments, (e.g., where OCS node 202 does not know if a resource quota request can be fully granted), a resource amount initially granted by OCS node 202 may be based on a predetermined value or percentage. For example, a predetermined value or percentage may be referred to as a minimum quota and may be significantly less than a plan's initial total resource amount (e.g., the starting resource allotment at the beginning of the plan's cycle). In this example, assuming a plan's initial total resource amount (also referred to as a maximum amount) is 5 GB, then a minimum quota may be 5 MB or a thousandth of the maximum amount.

In some embodiments, (e.g., where OCS node 202 does not know if a resource quota request can be fully granted), in lieu or in addition to providing a lesser resource quota than requested, a resource amount granted by OCS node 202 may be associated with a "short" validity time for indicating when the resource quota expires. For example, a "short" validity time may be an amount of time (e.g., 30 seconds) that is less than a default or typical validity time (e.g., 30 minutes) used for resources quota requests that are fully granted. In this example, the "short" validity time may be used to limit revenue exposure for a service provider and/or to trigger a requesting entity (e.g., Diameter client 300) to request a new resource quota after OCS node 202 has reserved resources of the shared resources plan, e.g., from OCS node 204.

In some embodiments, (e.g., where OCS node 202 knows that a resource quota request can be fully granted), a resource amount initially granted by OCS node 202 may be for the requested resource amount. For example, if OCS node 202 has previously reserved enough resources of a shared resources plan, then OCS node 202 can grant a resource quota request for a resource amount that is equal to or less than the reserved resource amount.

In step 303, a reservation request for reserving resources associated with the shared resources plan may be sent from OCS node 202 to OCS node 204. For example, OCS node 202 may be configured to use a reorder threshold value for triggering OCS node 202 to reserve resources associated with a shared resources plan whenever a reserved resource amount for the shared resources plan reaches or drops below the reorder threshold value. In this example, the reorder threshold value may be a portion of a plan's maximum amount, e.g., 25 MB or five hundredths of a plan's maximum amount of 5 GB.

In some embodiments, a reservation request may reserve an amount of resources based on a predetermined value or percentage. For example, OCS node 202 may be configured to use a quota reservation unit of 50 MB or a hundredth of a plan's maximum amount of 5 GB. In this example, OCS node 202 may request that 50 GB or a multiple thereof be reserved for a subscriber.

In step 304A, a reservation response for indicating that at least some requested resources were reserved may be sent from OCS node 204 to OCS node 202. For example, if there is an adequate amount of remaining resources of the shared resources plan, OCS node 204 may fully grant a reservation request (e.g., reserving the requested resource amount) and notify OCS node 202. Likewise, in this example, if there is not an adequate amount of remaining resources of the shared resources plan, OCS node 204 may partially grant the reservation request (e.g., reserving only a portion of the requested resource amount) and notify OCS node 202.

In step 304B, if the shared resources plan has no remaining resources available for consumption, a 'no quota' flag may be set for indicating this to OCS node 202 and/or other nodes in OCS cluster 106. For example, when OCS node 204 determines that a shared resources plan has no remaining resources available for consumption, OCS node 204 may notify OCS node 202 and/or other OCS nodes in OCS cluster 106. In this example, OCS node 204 may set a 'No Quota' flag in a memory that is shared or accessible by OCS node 202 and/or other nodes in OCS cluster 106. In another example, OCS node 204 may send a message or otherwise trigger OCS node 202 and/or other entity to set a local 'No Quota' flag for indicating that a shared resources plan has no remaining resources available for consumption.

In some embodiments, e.g., where shared resources are credits or money spent, OCS node 204 may notify OCS node 202 and/or other OCS nodes in OCS cluster 106 whenever a subscriber related charge (or a portion that is to be applied to a shared plan) exceeds the shared plan's available credit limit. In such embodiments, OCS node 202 and/or other OCS nodes in OCS cluster 106 may reject subsequent transactions involving that subscriber if such transactions require available credits, e.g., until additional credits or money is applied or granted to the shared plan such as by a subscriber authorization.

In step 305, a Diameter CCR update (CCR-U) message or another quota request message may be sent from Diameter client 300 to OCS node 202, where the CCR-U message includes an RSU AVP indicating a requested resource amount (e.g., 50 MB). For example, after a subscriber or a related UE 112 of a shared resources plan uses an initial or existing quota amount, Diameter client 300 may send a Diameter CCR-U message for requesting an additional resource quota associated with the subscriber.

In some embodiments, a CCR-U message may also include a used service unit (USU) AVP for indicating an amount of resources used by a subscriber. For example, a USU AVP may indicate the amount of used units measured from the point when the service became active or from the point when the previous measurement ended. In this example, the usage information may be usable for auditing, billing, and/or other purposes.

In step 302, a Diameter CCA update (CCA-U) message or another quota response message may be sent from OCS node 202 to Diameter client 300, where the CCA-U message includes a GSU AVP indicating a granted resource amount (e.g., 50 MB).

In some embodiments, OCS node 202 may grant a resource quota request based on a reserved resource amount (e.g., an amount previously reserved via OCS node 204). For example, if OCS node 202 has access to reserved resources for a subscriber of a shared resources plan, OCS node 202 may provide a resource quota of up to and including the reserved resource amount. In another example, if a predefined minimum quota amount is more than a reserved resource amount, OCS node 202 may provide a resource quota of the minimum quota amount.

In some embodiments, prior to granting or providing a resource quota, OCS node 202 may determine whether a 'No Quota' flag is set. For example, the flag being set may indicate that that a shared resources plan has no remaining resources available for consumption. In this example, if the flag is set (and if no reserved resources are available from a previous reservation), OCS node 202 may reject a resource quota request or otherwise indicate to Diameter client 300 that no quota is available.

Referring to FIG. 3B, in step 307, a Diameter CCR terminate (CCR-T) message or another quota request message may be sent from Diameter client 300 to OCS node 202, where the CCR-T message includes an USU AVP indicating an amount of resources used by the subscriber. For example, after a subscriber or a related UE 112 of a shared resources plan terminates a session or logouts, Diameter client 300 may send a Diameter CCR-T message for terminating a credit control session.

In step 308, a Diameter CCA terminate (CCA-T) message or another quota response message may be sent from OCS node 202 to Diameter client 300 for indicating that the CCR-T message has been received and acknowledged.

In some embodiments, OCS node 202 may use usage information received from Diameter client 300 (e.g., in a CCR-T) for billing, auditing, and/or other purposes. For example, OCS node 202 may use usage information associated with a subscriber to determine an amount of reserved resources to release. In this example, OCS node 202 may determine that a significant portion of a resource quota was not consumed based on the usage information received from Diameter client 300 and, as such, OCS node 202 may release these resources or a portion thereof by sending a reservation release to OCS node 204.

In step 309, a reservation release for releasing reserved resources (e.g., 25 MB) associated with the shared resources plan may be sent from OCS node 202 to OCS node 204. For example, after receiving a reservation release, OCS node 204 may increase a remaining resource amount associated with a shared resources plan by the amount of resources being released.

In some embodiments, an update process may occur when a subscriber top offs or reloads a shared resources plan's available resources. For example, a subscriber using UE 112 may interact with billing system 110 to buy additional resources (e.g., 5 GB of data or $50 of credit). In this example, an update process may involve billing system 110 notifying OCS node 204 and/or other nodes in OCS cluster 106, thereby triggering various actions (e.g., clearing or unsetting a 'No Quota' flag) to allow Diameter client 300 to request and receive additional resource quotas.

In step 310, a new quota grant for indicating that the shared resources plan has additional resources for consumption may be sent from billing system 110 to OCS node 204.

In step 311, OCS node 204 may clear a 'No Quota' flag (e.g., a local flag at OCS 204), thereby indicating that the shared resources plan has resources for consumption.

In step 312, OCS node 204 may notify OCS node 202 and other nodes in OCS cluster 106 that the shared resources plan has resources for consumption. For example, OCS node 202 (and OCS node 200) may receive a notification from OCS node 204 indicating that resources were added to a shared resources plan and, in response, OCS node 202 (and OCS node 200) may clear a local flag, thereby indicating that the shared resources plan has resources for consumption.

It will be appreciated that FIGS. 3A-3B are for illustrative purposes and that different and/or additional messages, steps, and/or actions than those depicted in FIGS. 3A-3B may be used. It will also be appreciated that various messages, steps, and/or actions described herein may occur in a different order or sequence than the order or sequence depicted in FIGS. 3A-3B.

FIG. 4 is a diagram illustrating an example process 400 for lockless communications network resource quota sharing. In some embodiments, process 400 described herein, or portions thereof, may be performed at or performed by a network node (e.g., OCS node 202 or 204), QME 206, and/or another module or node. In some embodiments, process 400 or related actions may be performed by a first charging node (e.g., OCS node 202) of a distributed charging system (e.g., OCS cluster 106) associated with a communications network (e.g., environment 100) comprising multiple charging nodes, wherein the first charging node is for handling communications network resource quota requests associated with a first member (e.g., a child member) of a shared resources plan, wherein a second charging node (e.g., OCS node 204) manages resource reservations associated with the shared resources plan.

Referring to process 400, in step 402, a first communications network resource quota request associated with a first member of a shared resources plan for requesting a first resource amount from the shared resources plan may be received from a requesting entity. For example, PGW 108 or Diameter client 300 may receive a network attachment request or other message indicating that a communications network subscriber needs a communications network resource quota. In this example, PGW 108 or Diameter client 300 may send a Diameter CCR message to OCS cluster 106 or a node thereof (e.g., OCS node 202) for requesting the communications network resource quota for use by the communications network subscriber.

In step 404, without confirming that the shared resources plan has enough available resources to allot the first resource amount, a first communications network resource quota for the first member may be provided to the requesting entity, wherein the first communications network resource quota indicates a second resource amount less than the first resource amount and/or wherein the first communications network resource quota is associated with a validity time indicating when the first communications network resource quota expires. For example, OCS node 202 may be configured to provide a minimum quota (e.g., a predetermined amount of resources) for a subscriber of a shared resources plan to PGW 108 or Diameter client 300 without locking the shared resources plan (or related account) and/or without receiving confirmation that the requested resources are available for consumption (e.g., from OCS node 204 managing the allocation and/or reservation of resources of the shared resources plan). In another example, OCS node 202 may be configured to provide, to PGW 108 or Diameter client 300, a resource quota with a validity time indicating when the resource quota expires for a subscriber of a shared resources plan. In this example, the validity time may be a short amount of time (e.g., 30 seconds) relative to a typical or default validity time (e.g., 60 minutes) used when granting resource quotas. Continuing with this example, after the resource quota expires, PGW 108 or Diameter client 300 must request another resource quota (which may provide enough time for OCS node 202 to request and reserve resources of the shared resources plan from OCS node 204).

In step 406, a first resource reservation request for reserving resources of the shared resources plan may be sent to a second charging node. For example, after providing a minimum quota (e.g., 2 MB) for a subscriber of a shared resources plan to PGW 108 or Diameter client 300, OCS node 202 may send a resource reservation request to OCS node 204 such that OCS node 202 may reserve some resources of the shared resources plan and grant subsequent communications network resource quota requests for the subscriber using the reserved resources.

In some embodiments, a first member of a shared resources plan may be allotted a communications network resource quota concurrently with a second member of the shared resources plan being allotted a communications network resource quota. In such embodiments, the quotas allotted to the different members may be for a same amount or different amounts.

For example, OCS node 200 and/or an associated QME 206 may perform a quota related transaction involving a first member of a shared resources plan, while OCS node 202 and/or an associated QME 206 concurrently perform(s) a quota related transaction involving a second member of a shared resources plan. In this example, OCS node 200, OCS node 202, and other OCS nodes in OCS cluster 106 may use a lockless quota management algorithm which allow multiple quota related transactions associated with the shared resources plan to occur concurrently (e.g., simultaneously or nearly simultaneously). In contrast, a lock-based quota management system would prevent quota related transactions associated with a shared resources plan from being processed while a first quota related transaction associated with the shared resources plan was occurring, e.g., regardless of which OCS node in OCS cluster 106 was handling the quota related transactions.

In some embodiments, a first resource amount includes a data usage amount, a time usage amount, or a money or credit amount. For example, PGW 108 may request and receive a data usage quota from OCS node 202 for accessing data and/or services via communications environment 100. In another example, PGW 108 may request and receive a credit or money quota from OCS node 202 for charging services or items associated with communications environment 100.

In some embodiments, when a first resource reservation request is for reserving a resource amount greater than a remaining resource amount that a shared resources plan has available, a second charging node (e.g., OCS node 204) notifies a first charging node (e.g., OCS node 202) by setting a flag indicating that the shared resources plan has no more resources available for consumption and/or provides at least a portion of the resource amount requested in the first resource reservation request.

In some embodiments, process 400 may include prior to providing a first communications network resource quota, determining that a flag is not set, wherein the flag being set indicates that a shared resources plan has no more resources available for consumption (e.g., no more internet data to consume or money to spend).

In some embodiments, process 400 may include receiving, from a second charging node, a reserved resource amount based on a first resource reservation request; receiving, from a requesting entity, a second communications network resource quota request for requesting a third resource amount from a shared resources plan; and providing, using the reserved resource amount, a second communications network resource quota for a first member of the shared resources plan to the requesting entity.

In some embodiments (e.g., when a third resource amount is more than a reserved resource amount or causes the reserved resource amount to reach or dip below a reorder threshold value), requesting, from a second charging node, a second resource reservation request for reserving additional data from a shared resources plan.

In some embodiments, a communications network resource quota request may include a Diameter message or a Diameter CCR. For example, PGW 108 may send a CCR-I message containing a RSU AVP for requesting communications network resource quota to OCS node 202. In another example, Diameter client 199 (e.g., a PCEF) may send a CCR-U message containing a RSU AVP to OCS node 200.

In some embodiments, a requesting entity in process 400 may include PGW 108, a Diameter network element, a PCEF, a BBERF, a TDF, or a DPI function.

In some embodiments, a first charging node and a second charging node may be associated with a distributed OCS, e.g., OCS cluster 106.

It will be appreciated that FIG. 4 is for illustrative purposes and that different and/or additional steps and/or actions may be used. It will also be appreciated that various steps and/or actions described herein may occur in a different order or sequence.

It should be noted that a charging node, OCS cluster 106, OCS node 200, OCS node 202, OCS node 204, QME 206, and/or functionality described herein may constitute a special purpose computing device. Further, a charging node, OCS cluster 106, OCS node 200, OCS node 202, OCS node 204, QME 206, and/or functionality described herein can improve the technological field of communications networks, OCS architectures, and resource sharing. For example, by utilizing lockless communications network resource quota sharing, latency and performance issues associated with resource sharing and related charging can be mitigated or prevented. Further, a distributed OCS cluster that utilizes lockless communications network resource quota sharing can reduce complexity involving scenarios where different members of a shared resources plan are handled by different nodes of the distributed OCS cluster since locking is not required and related locking overhead is avoided.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for lockless communications network resource quota sharing, the method comprising:
at a first charging node of a distributed charging system comprising multiple charging nodes, wherein the first charging node is for handling communications network resource quota requests associated with a first member of a shared resources plan, wherein a second charging node of the distributed charging system manages resource reservations associated with the shared resources plan:
  receiving, from a requesting entity, a first communications network resource quota request for requesting a first resource amount from the shared resources plan;
  without locking the shared resources plan and without confirming with the second charging node that the shared resources plan has enough available resources to allot the first resource amount, providing, to the requesting entity, a first communications network resource quota for the first member, wherein the first communications network resource quota indicates a second resource amount less than the first resource amount and/or wherein the first communications network resource quota is associated with a validity time indicating when the first communications network resource quota expires; and
  sending, to the second charging node, a first resource reservation request for reserving resources of the shared resources plan.

2. The method of claim 1 wherein a second member of the shared resources plan is allotted a third communications network resource quota concurrently with the first member being allotted the first communications network resource quota.

3. The method of claim 1 wherein the first resource amount includes a data usage amount, a time usage amount, or a money or credit amount.

4. The method of claim 1 wherein when the first resource reservation request is for reserving a resource amount greater than a remaining resource amount that the shared resources plan has available, the second charging node notifies the first charging node by setting a flag indicating that the shared resources plan has no more resources available for consumption and/or provides at least a portion of the resource amount requested in the first resource reservation request.

5. The method of claim 1 comprising:
  prior to providing the first communications network resource quota, determining that a flag is not set, wherein the flag being set indicates that the shared resources plan has no more resources available for consumption.

6. The method of claim 1 comprising:
  receiving, from the second charging node, a reserved resource amount based on the first resource reservation request;
  receiving, from the requesting entity, a second communications network resource quota request for requesting a third resource amount from the shared resources plan; and
  providing, using the reserved resource amount, a second communications network resource quota for the first member to the requesting entity.

7. The method of claim 6 comprising:
  requesting, from the second charging node, a second resource reservation request for reserving additional resources of the shared resources plan.

8. The method of claim 1 wherein the requesting entity includes a Diameter network element, a packet data network gateway (PGW), a policy and charging enforcement function (PCEF), a bearer binding and event reporting function (BBERF), a traffic detection function (TDF), or a deep packet inspection (DPI) function.

9. The method of claim 1 wherein the first charging node and the second charging node are online charging system (OCS) nodes and wherein the first communications network resource quota request includes a Diameter message or a Diameter credit control request (CCR).

10. A system for lockless communications network resource quota sharing, the system comprising:
  at least one processor;
  a memory; and
  at a first charging node of a distributed charging system comprising multiple charging nodes, wherein the first charging node is implemented using the at least one processor and memory, wherein the first charging node is for handling communications network resource quota requests associated with a first member of a shared resources plan, wherein a second charging node of the distributed charging system manages resource reservations associated with the shared resources plan, wherein the first charging node is configured for:
  receiving, from a requesting entity, a first communications network resource quota request for requesting a first resource amount from the shared resources plan;
  without locking the shared resources plan and without confirming with the second charging node that the shared resources plan has enough available resources to allot the first resource amount, providing, to the requesting entity, a first communications network resource quota for the first member, wherein the first communications network resource quota indicates a second resource amount less than the first resource amount and/or wherein the first communications network resource quota is associated with a validity time indicating when the first communications network resource quota expires; and
  sending, to the second charging node, a first resource reservation request for reserving resources of the shared resources plan.

11. The system of claim 10 wherein a second member of the shared resources plan is allotted a third communications network resource quota concurrently with the first member being allotted the first communications network resource quota.

12. The system of claim 10 wherein the first resource amount includes a data usage amount, a time usage amount, or a money or credit amount.

13. The system of claim 10 wherein when the first resource reservation request for reserving a resource amount greater than a remaining resource amount that the shared resources plan has available, the second charging node notifies the first charging node by setting a flag indicating that the shared resources plan has no more resources available for consumption and/or provides at least a portion of the resource amount requested in the first resource reservation request.

14. The system of claim 10 wherein the first charging node is configured for:
  prior to providing the first communications network resource quota, determining that a flag is not set, wherein the flag being set indicates that the shared resources plan has no more resources available for consumption.

15. The system of claim 10 wherein the first charging node is configured for:

receiving, from the second charging node, a reserved resource amount based on the first resource reservation request;

receiving, from the requesting entity, a second communications network resource quota request for requesting a third resource amount from the shared resources plan; and providing, using the reserved resource amount, a second communications network resource quota for the first member to the requesting entity.

16. The system of claim 15 wherein the first charging node is configured for:
requesting, from the second charging node, a second resource reservation request for reserving additional resources of the shared resources plan.

17. The system of claim 10 wherein the requesting entity includes a Diameter network element, a packet data network gateway (PGW), a policy and charging enforcement function (PCEF), a bearer binding and event reporting function (BBERF), a traffic detection function (TDF), or a deep packet inspection (DPI) function.

18. The system of claim 10 wherein the first charging node and the second charging node are online charging system (OCS) nodes and wherein the first communications network resource quota request includes a Diameter message or a Diameter credit control request (CCR).

19. A non-transitory computer readable medium having stored thereon executable instructions that when executed by at least one processor of a computer cause the computer to perform steps comprising:
at a first charging node of a distributed charging system comprising multiple charging nodes, wherein the first charging node is for handling communications network resource quota requests associated with a first member of a shared resources plan, wherein a second charging node of the distributed charging system manages resource reservations associated with the shared resources plan:

receiving, from a requesting entity, a first communications network resource quota request for requesting a first resource amount from the shared resources plan;

without locking the shared resources plan and without confirming with the second charging node that the shared resources plan has enough available resources to allot the first resource amount, providing, to the requesting entity, a first communications network resource quota for the first member, wherein the first communications network resource quota indicates a second resource amount less than the first resource amount and/or wherein the first communications network resource quota is associated with a validity time indicating when the first communications network resource quota expires; and sending, to the second charging node, a first resource reservation request for reserving resources of the shared resources plan.

20. The non-transitory computer readable medium of claim 19 wherein a second member of the shared resources plan is allotted a third communications network resource quota concurrently with the first member being allotted the first communications network resource quota.

* * * * *